May 2, 1933.  P. F. SHIVERS  1,907,093
GRID GLOW POTENTIOMETER
Filed Feb. 12, 1930
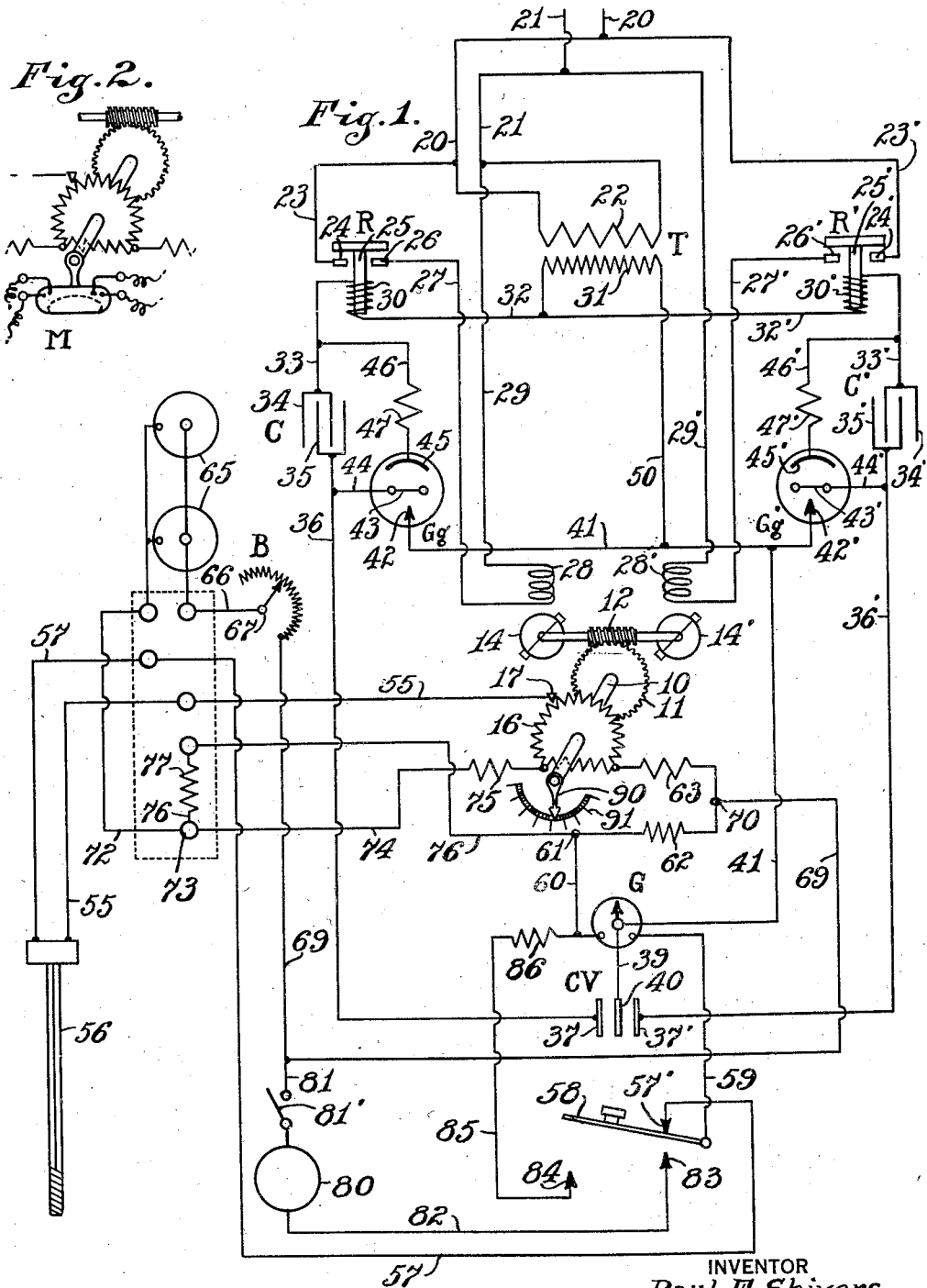
INVENTOR
Paul F. Shivers,
BY
Hood + Hahn
ATTORNEYS Patented May 2, 1933

1,907,093

UNITED STATES PATENT OFFICE

PAUL F. SHIVERS, OF WABASH, INDIANA, ASSIGNOR TO MINNEAPOLIS HONEYWELL REGULATOR COMPANY, OF MINNEAPOLIS, MINNESOTA, A CORPORATION OF DELAWARE

GRID-GLOW POTENTIOMETER

Application filed February 12, 1930. Serial No. 427,924.

The object of my invention is to produce an improved sensitive potentiometer, embodying grid-glow controlling circuits, which may be utilized, in conjunction with a thermocouple or other similar instrument, to indicate temperatures and/or to manipulate circuits of temperature controlling apparatus.

The accompanying drawing illustrates my invention diagrammatically.

Fig. 1 is a general circuit diagram, and

Fig. 2 is a fragmentary diagram indicating the mounting of circuit-controlling elements on the potentiometer shaft, which circuit-controlling elements may be connected to suitable temperature-controlling mechanism, such as a fuel burner or other heat-controlling mechanism, not shown.

In the drawing 10 indicates a suitably mounted oscillatory shaft of the adjustable-resistance element of a potentiometer, said shaft being provided with a worm-wheel 11 meshing with a worm 12 which is operatively connected to the rotors of two oppositely acting electric motors 14 and 14'. Carried by shaft 10 is the resistance element 16 of a rheostat contacted by brush 17.

The line wires 20 and 21 are connected to the primary 22 of a transformer T which, in case of a 110 V. line, may be a step-up transformer.

A relay R is arranged to control an energizing circuit for the field of motor 14 as follows: line 20, wire 23, terminal 24, breaker 25, terminal 26, wire 27, field winding 28, wire 29 to line 21.

Similarly a relay R' is arranged to control an energizing circuit for the field of motor 14' as follows: line 20, wire 23', terminal 24', breaker 25', terminal 26', wire 27', field winding 28', wire 29' to line 21.

One end of the operating coil 30 of relay R is connected to the secondary 31 of transformer T by wire 32 and the other end of said coil is connected by wire 33 with plate 34 of a condenser C, the other plate 35 of which is connected by wire 36 with stationary plate 37 of a variable condenser CV, comprising the fixed plates 37, 37' and the movable plate 40.

Similarly one end of the operating coil 30' of relay R' is connected to the secondary 31 of transformer T by wire 32' and the other end of this coil is connected by wire 33' with plate 34' of condenser C'. Plate 35' of condenser C' is connected by wire 36' with plate 37' of the variable condenser CV.

The movable plate 40 of the variable condenser CV is carried by the arm 39 of a galvanometer G, said plate being connected by wire 41 with the anode terminals 42 and 42' of two similar grid-glow tubes Gg and Gg'. Plate 40 is moved by the galvanometer arm toward and from plates 37 and 37'. The grids 43 and 43' of tubes Gg and Gg' are respectively connected by wires 44 and 44' with wires 36 and 36' and the cathodes 45 and 45' of said tubes are respectively connected by wires 46 and 46' with wires 33 and 33', said wires 46 and 46' respectively including properly proportioned balancing resistances 47 and 47'. A wire 50 connects wire 41 with one end of the secondary 31 of transformer T.

A wire 55 leads from brush 17 to one terminal of a thermocouple 56 which is to be placed at the point of desired temperature measurement and a wire 57 leads from the other terminal of said couple to a terminal 57' normally contacted by a switch 58 from which wire 59 leads to the positive terminal of galvanometer G. A wire 60 leads from the negative terminal of galvanometer G to a terminal 61 and thence through a sensitivity resistance 62 and a balancing resistance 63 to one end of element 16.

In order to impress upon element 16 an electro-motive force counter to that impressed by the thermocouple the following arrangement is provided:

Dry cells 65 have their positive terminals connected by wire 66 with the adjustable terminal 67 of a rheostat B and the coil of this rheostat is connected by wire 69 with a terminal 70 between resistances 62 and 63. The negative sides of cells 65 are connected by wire 72 with a terminal 73 from which a wire 74 leads, through a balancing resistance 75, to the end of element 16 opposite to that to which resistance 63 is connected. A wire 76, embodying a resistance 77 connects terminal 73 with terminal 61.

For testing and balancing purposes a "standard cell" (usually cadmium-mercury) 80 has its positive side connected by wire 81 and normally open switch 81' to wire 69 and its negative side connected by wire 82 with a terminal 83 adapted to be contacted by switch 58 when said switch is separated from terminal 57'. A terminal 84 is arranged to be connected by switch 58 with terminal 83 and this terminal 84 is connected by wire 85, through sensitivity-controlling resistance 86 with the negative side of galvanometer G.

An indicator finger 90 carried by shaft 10 of the potentiometer sweeps the scale 91, said finger and scale being preferably relatively angularly adjustable in a well-known manner.

In general, the circuits, other than those which include the grid-glow tubes Gg and Gg' and the condenser plates 37, 37' and 40, are well-known and are commonly in use in the well-known Leeds & Northrup potentiometers. It is therefore believed that it is unnecessary here to describe in detail the reactions which will occur upon change of temperature of the hot junction of the thermocouple other than to say that with brush 17 at any given point in resistance 16 the arm 39 of galvanometer G will stand in a middle or zero position when the temperature of the hot junction of the thermo-couple is that for which brush 17 has been adjusted on resistance 16 and variations of this temperature will be indicated by movement of the galvanometer in one direction or the other from this zero position.

My invention resides in the provision of the grid-glow circuits, the variable condenser circuits, the control of said condenser by the galvanometer, and the coordinated means for automatically adjusting the potentiometer resistances whereby variation of temperature of the hot junction of the thermo-couple will cause automatic adjustment of the potentiometer resistances until E. M. F. of the thermo-couple is balanced and the variable condenser is thus permitted to resume a normal zero position.

The desired relations are established by so proportioning the capacities of condensers C, and C', and the resistances 47 and 47' that the grid-glow tubes Gg and Gg' will not glow (to permit current flow therethrough) when plate 40 of the variable condenser is in its medial position.

Whenever plate 40 is shifted from its middle position (say toward plate 37) an unbalanced condition is created in tube Gg thereupon permitting current flow through R so as to close the circuit of motor 14 to shift resistance 16 relative to brush 17 until a balanced relation is established and plate 40 returns to its middle position. Similarly, if plate 40 is shifted from its middle position toward plate 37', tube Gg' is unbalanced, motor 14' is energized, and resistance 16 is shifted in the opposite direction until a balanced relation is established.

It will now be readily understood that shaft 10 may be caused to actuate circuit controlling elements, such for instance as the mercury tube M (Fig. 2), arranged to dominate means for heating the thermo-couple so as to supply heat to the thermo-couple in such manner as to tend to maintain it at a desired temperature, and that in such an arrangement heat will be automatically applied to the thermo-couple so long only as it is too cool. The control of a heating medium by control circuits is so well known that further description is thought to be unnecessary.

It will of course, be understood that other means, such as actually-contacting elements, might be substituted for the variable condenser CV, to unbalance the grid-glow tube circuits.

I claim as my invention:

1. A potentiometer comprising, a galvanometer, a balancing rheostat therefor, electro-motive means for adjusting said rheostat in opposite directions, a variable condenser having a movable element controlled by the galvanometer, a pair of grid-glow tubes in circuits with said variable condenser, and means controlled by energization of said grid-glow circuits for controlling said electro-motive means.

2. A potentiometer comprising a galvanometer, a balancing rheostat therefor, electro-motive means for adjusting said rheostat in opposite directions, a variable condenser comprising a pair of fixed plates and an intermediate plate movable by the galvanometer between said fixed plates, a pair of grid-glow tubes, connections between the anodes of said tubes and the movable plate of the variable condenser, two relays, an energizing circuit for each relay, each including the cathode of one tube and one fixed plate of the variable condenser, the grid of each tube being connected to its cathode circuit, two control circuits, each including the circuit-breaker of a relay and an energizing circuit for producing one-way movement of said electro-motive means, a circuit including the balancing rheostat, and means for varying the voltage in said circuit.

3. A potentiometer comprising a galvanometer, a balancing rheostat therefor, electro-motive means for adjusting said rheostat in opposite directions, a pair of grid-glow tubes, means controlled by energization of said grid-glow tubes for controlling said electro-motive means, and means controlled by the galvanometer for varying the tendency of the grids of the grid-glow tubes to obstruct electron flow.

4. A potentiometer comprising a galvanometer, a balancing rheostat therefor, electro-motive means for adjusting said rheostat in opposite directions, a pair of grid-glow tubes, two relays, an energizing circuit for each relay, each including the cathode of one tube, the grid of each tube being connected to its cathode circuit, two lines of electrical connections, each including the circuit-breaker of a relay and an energizing circuit for producing one-way movement of said electro-motive means, a line of electrical connections including the two tubes and the energizing circuits of the two relays, and means controlled by the galvanometer for varying the tendency of the grids of the two tubes to obstruct electron flow.

In witness whereof, I Paul F. Shivers have hereunto set my hand at Wabash, Indiana, this 6th day of February, A. D. one thousand nine hundred and thirty.

PAUL F. SHIVERS.